United States Patent [19]

Deloy

[11] Patent Number: 5,689,176
[45] Date of Patent: Nov. 18, 1997

[54] POWER FACTOR/HARMONICS CORRECTION CIRCUITRY AND METHOD THEREOF

[76] Inventor: Jeff J. Deloy, 1638 Park Towne La. NE., Cedar Rapids, Iowa 52402

[21] Appl. No.: 693,762

[22] Filed: Aug. 7, 1996

[51] Int. Cl.⁶ .................... G05F 1/10; G05F 1/44; H02M 1/12
[52] U.S. Cl. .................... 323/222; 323/288; 363/41
[58] Field of Search .................... 323/222, 285, 323/283, 284, 299, 288; 363/41

[56] References Cited

U.S. PATENT DOCUMENTS

| | | | |
|---|---|---|---|
| 4,486,702 | 12/1984 | Edwards | 322/28 |
| 4,536,700 | 8/1985 | Bello et al. | 323/288 |
| 4,546,421 | 10/1985 | Bello et al. | 363/21 |
| 4,677,366 | 6/1987 | Wilkinson et al. | 323/222 |
| 4,885,675 | 12/1989 | Henze et al. | 363/45 |
| 4,935,859 | 6/1990 | Kirchberg et al. | 363/39 |
| 4,935,860 | 6/1990 | Kirchberg et al. | 363/39 |
| 4,947,102 | 8/1990 | Ekstrand et al. | 323/293 |
| 4,977,492 | 12/1990 | Kirchberg, Jr. et al. | 363/41 |
| 5,115,185 | 5/1992 | Fraidlin et al. | 363/45 |
| 5,301,098 | 4/1994 | Dhyanchand et al. | 363/97 |
| 5,317,498 | 5/1994 | Dhyanchand et al. | 363/43 |
| 5,327,335 | 7/1994 | Maddali et al. | 363/39 |
| 5,349,515 | 9/1994 | Megeid | 363/21 |
| 5,359,277 | 10/1994 | Cowett, Jr. | 323/207 |
| 5,377,092 | 12/1994 | Rowand et al. | 363/39 |
| 5,404,093 | 4/1995 | Cowett, Jr. | 323/207 |
| 5,414,342 | 5/1995 | Mammano et al. | 323/288 |
| 5,428,286 | 6/1995 | Kha | 323/222 |
| 5,459,392 | 10/1995 | Mandelcorn | 323/222 |
| 5,490,055 | 2/1996 | Boylan et al. | 363/41 |
| 5,572,416 | 11/1996 | Jacobs et al. | 323/222 |

*Primary Examiner*—Peter S. Wong
*Assistant Examiner*—Bao Q. Vu
*Attorney, Agent, or Firm*—Gregory G. Williams; M. Lee Murrah

[57] ABSTRACT

The power factor/harmonic correction circuitry accomplishes this by using a non-linear ramp signal and/or by using a negative feedforward technique. The power factor/harmonic correction circuitry accomplishes the feedforward technique by using a modulated ramp circuit which adds to the ramp signal a constant value that is proportional to the input voltage. Furthermore, the power factor/harmonics correction circuitry can provide improved performance and stability by using a non-linear ramp circuit which produces the non-linear ramp signal which has an increasing slope over the switching cycle.

23 Claims, 11 Drawing Sheets

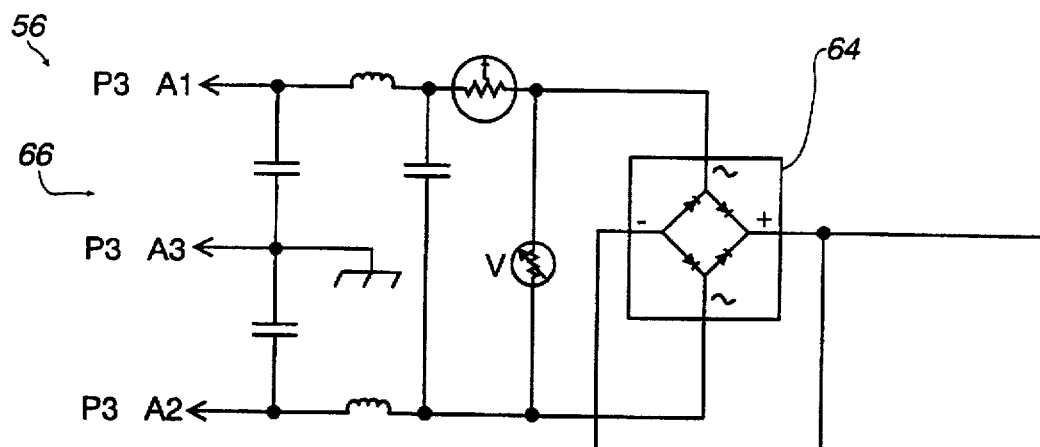
*Fig. 7a*
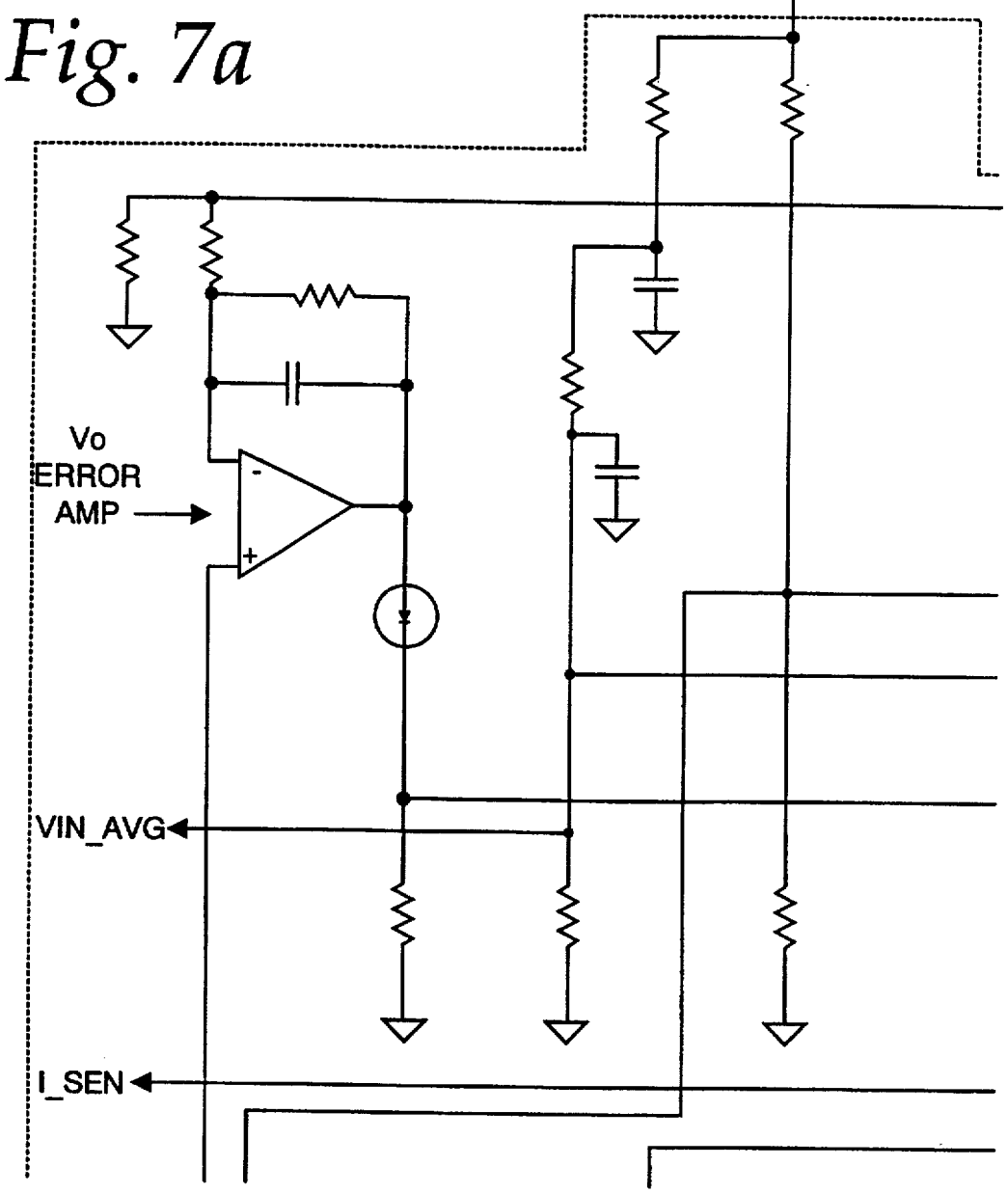

| Fig. 8a | Fig. 8b |

POWER FACTOR/HARMONICS CORRECTION CIRCUITRY AND METHOD THEREOF

FIELD OF THE INVENTION

The present invention generally relates to power supplies and more particularly to power factor/harmonic correction circuitry and method for a power supply which is effective for a wide range of frequencies and a wide range of voltage inputs.

BACKGROUND OF THE INVENTION

Many electronic systems require that the alternating current line voltage be converted to a direct current. For that purpose, power supplies in the form of switched converters and inverters have been developed. Such circuits usually involve a large storage capacitor connected across a rectifier bridge output. This causes the input line current to become highly non-sinusoidal. Accordingly, as shown in FIG. 1a, poor effective power factors are encountered which results in higher input current for a given power output of the power supplies. Also, as shown in FIG. 1b, the non-sinusoidal input exhibits high harmonic distortion which results in high peak currents being drawn from the source at their harmonic frequencies.

A conventional switched converter operates as a capacitive input lead for the rectified line voltage. Such a lead draws relatively high currents near the peaks of the alternating current cycle, and substantially zero current for the remainder of the cycle. This results in a poor power factor and harmonic distortion, which manifests itself as a larger RMS current for a give input voltage and power lead, than if the lead were purely resistive. A typical prior art switched power supply, for example, draws about 1.5 times the RMS current for a given power output, as compared with a purely resistive lead. As such, for a given line current, the typical switched power supply is capable of delivering only about two-thirds the power which could be delivered if the line current were sinusoidal, which is the case when the load is purely resistive.

Commercially available products can reduce the power factor/harmonics distortion problem to obtain the signals as shown in FIG. 1c. These products, however, may exhibit poor performance characteristics over wide input frequency ranges (such as operating at 60 Hz vs. 400 Hz power which is used on aircraft) and over varying input impedances. These commercially available products also exhibit poor transient response.

SUMMARY OF THE INVENTION

The present invention involves a power factor/harmonic correction module which can be used in the control circuit for a switched boost converter, where the control circuit provides the switching control signal for the boost converter. The power factor/harmonic correction circuitry provides improved power factor/harmonic distortion correction for a wide range of frequencies and a wide range of voltage inputs. The power factor/harmonic correction circuitry accomplishes this by using a non-linear ramp signal and/or by using a negative feedforward technique. The power factor/harmonic correction circuitry accomplishes the feed-forward technique by using a modulated ramp circuit which acids to the ramp signal a constant value that is proportional to the input voltage. Furthermore, the power factor/harmonics correction circuitry can provide improved performance and stability by using a non-linear ramp circuit which produces the non-linear ramp signal which has an increasing slope over the switching cycle.

BRIEF DESCRIPTION OF THE DRAWINGS

Other aspects and advantages of the present invention may become apparent upon reading the following detailed description and upon reference to the drawings in which:

FIGS. 7a–7f show a particular embodiment of the power factor/harmonic correction circuitry which uses a modulate, non-linear ramp signal according to the principles of the present invention.

Figure 1A:
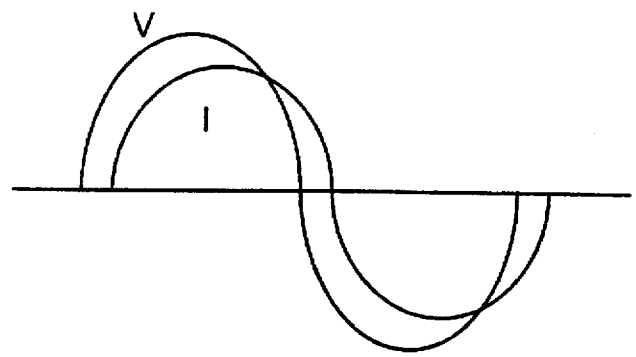
FIGS. 1a–1c are voltage and current wave forms to facilitate understanding of power factor and harmonic distortion correction.
Figure 1B:
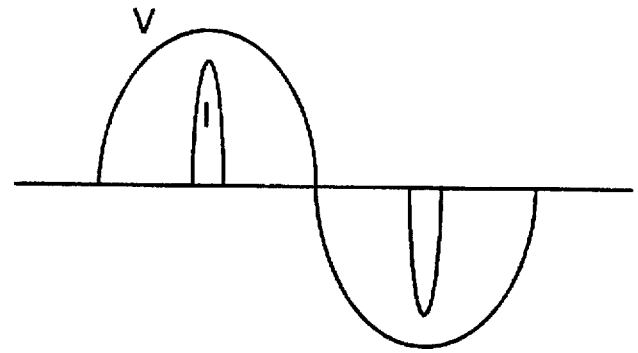
Figure 1C:
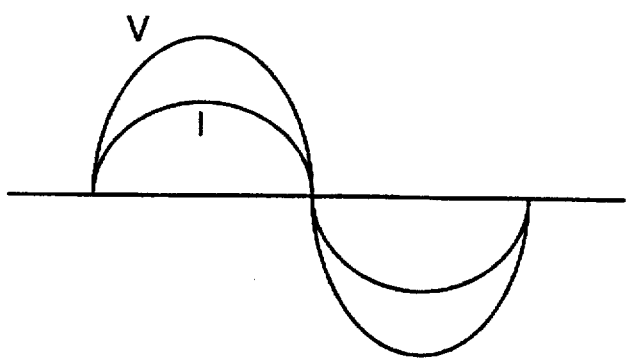

While the invention is susceptible to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION OF THE INVENTION

Figure 2:
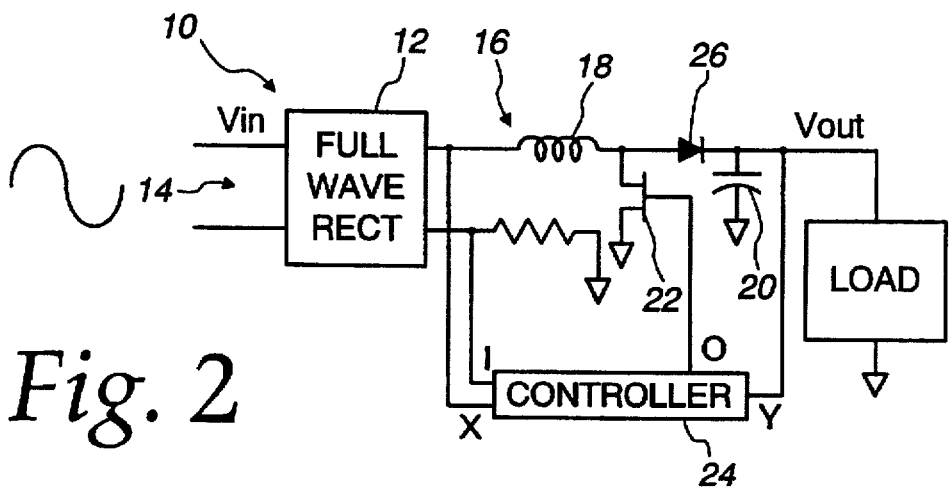
FIG. 2 shows a block diagram for a power supply employing active power factor/harmonic correction.

An illustrative embodiment of the improved power factor/harmonic correction circuitry according to the principles of the present invention and methodology is described below as it might be implemented. FIG. 2 shows a power supply 10 which can incorporate certain aspects of the power factor/harmonics correction circuitry and method. The power supply includes a rectifier 12 adapted to be connected to an alternating current line 14. Alternatively, a DC source could be used which would not require a rectifier. The power supply 10 includes a boost converter 16 connected to the output ortho rectifier 12. The boost converter 16 includes a series connected inductance coil 18 and a storage capacitor 20. A power switch 22 connected between the inductance coil 18 and the storage capacitor 20 is responsive to a switch control signal from a control circuit 24 connected to the power switch 22 for controlling the operation of the boost converter 16. In this particular embodiment, a diode or equivalent component 26 is connected between the power switch connection and the storage capacitor 20.

Figure 3:
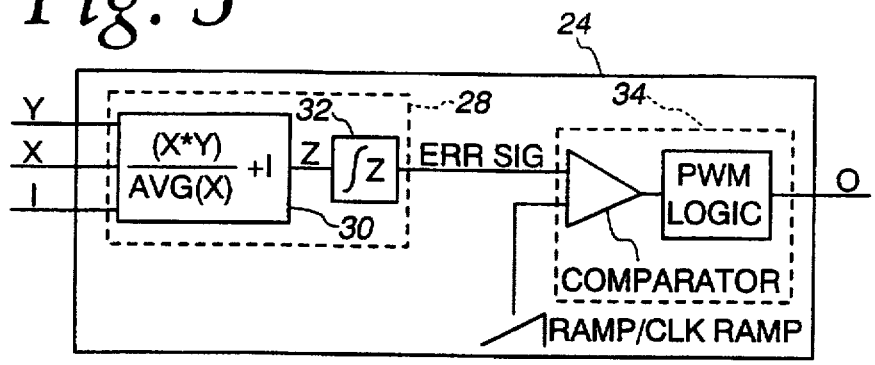
FIG. 3 shows a block diagram for a controller of the power supply of FIG. 2.

FIG. 3 shows a particular embodiment of a control circuit 24 of FIG. 2 having an error compensation circuit 28 which includes a multiplier 30 producing a signal Z, where X=the rectified input voltage signal Vin which is scaled, Y=Vo feedback, avg(X)=average of X, I=voltage representing the current level through the boost converter 16 and Z=(X*Y)/avg(X)–I, or 0V if the current matches the input voltage waveform. Other embodiments can simply multiply X*Y, or divide X*Y by the square of the average of X. An error amplifier 32 amplifies or integrates the signet Z from the multiplier 30 to produce an error signal. A pulse width modulator 34 compares the modified error signal to a ramp signal, and the pulse width modulator in turn provides the switch control signal.

Figure 4:
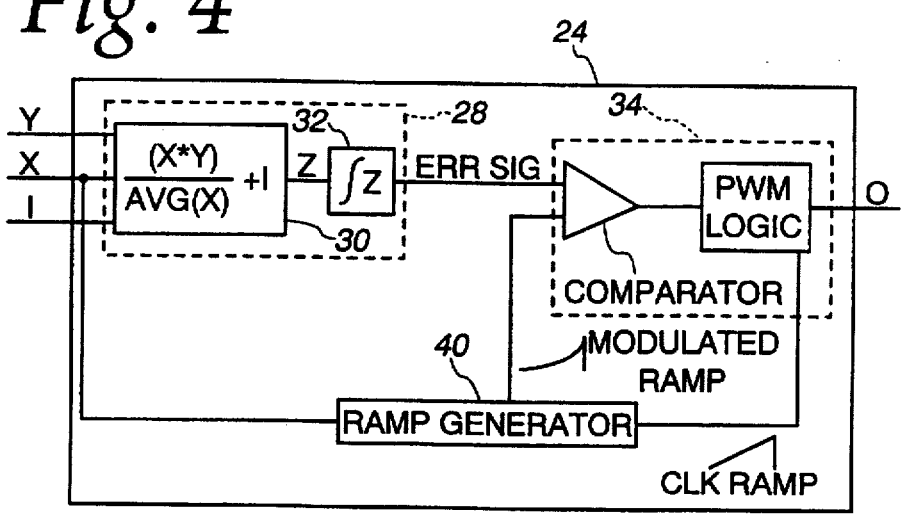
FIG. 4 shows a block diagram for a controller employing the power factor/harmonic correction circuitry according to the principles of the present invention.
Figure 5:
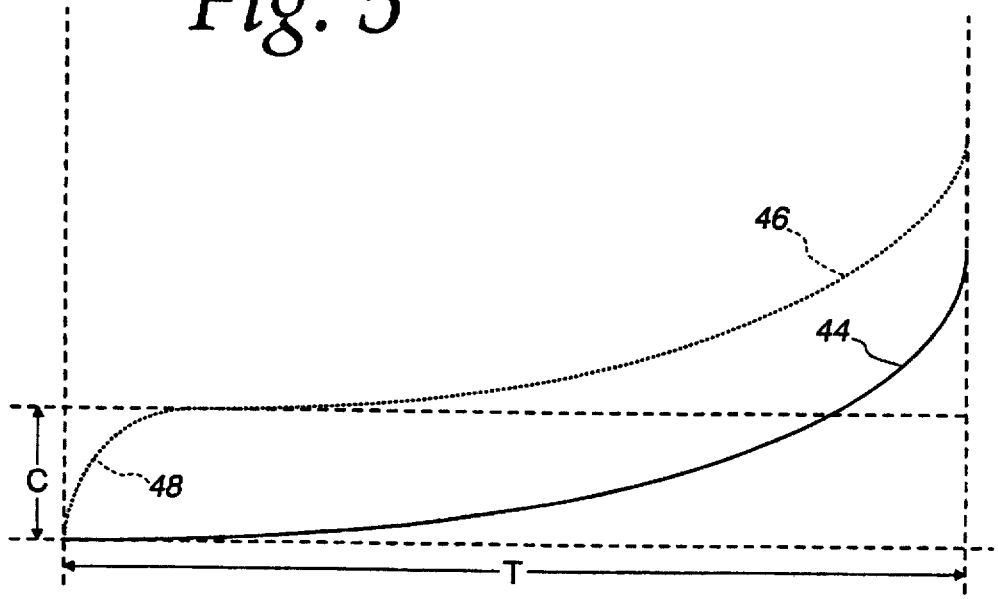
FIG. 5 shows a non-linear ramp signal and a modulated non-linear ramp signal according to the principles of the present invention.

To improve performance, a modulated ramp circuit 40 was incorporated into the control circuit 24 as shown in FIG. 4. According to one aspect of the present invention as best shown in FIG. 5, the modulated ramp circuit 40 receives the rectified input voltage Vin or a scaled version thereof and adds to the ramp signal 44 a constant value C that is proportional to the rectified input voltage Vin over the switching cycle T, resulting in the modulated ramp signal 46. The ramp signal 44 is non-linear in FIG. 5, but in accordance with this aspect of the present invention, the ramp signal 44 can be linear.

The modulation of the ramp signal using Vin:

1. provides a negative feedforward path from the converter input (Vin);

2. reduces the effect of transients that appear at the converter input;

3. improves noise rejection of the converter due to its negative feedforward arrangement which compensates for the phase lag in the boost converter inductor;

4. improves stability for varying input impedance at the converter input also due to the negative feedforward arrangement;

5. allows for good converter operation for inputs over a wide frequency range (for example, the converter is stable for DC inputs or inputs from 47 Hz to 1KHZ);

6. does not create distortion since the modulation is created by the input of the boost converter (Vin) which is linearly scaled to provide the modulation constant each switching cycle;

7. allows for large output load changes due to the increased stability of the negative feed forward arrangement; and 8. allows power factor/harmonic correction to Vin=Vout.

FIG. 5 shows a leading edge curve 48 which reaches the constant value as defined by Vin. Modulating the ramp signal using the leading edge curve 48 reduces the loop gain when Vin approaches Vout where the pulse width is at its minimum, and when using a substantially linear ramp signal, allows for higher gain when Vin is at its minimum and pulse width at its maximum.

The leading edge curve of the modulated ramp signal:

1. maintains overall loop gain (dynamically) as the input voltage increases to its peak by decreasing error amplifier gain;

2. maintains overall loop gain (dynamically) as the input voltage approaches its minimum by increasing the error amplifier gain; and 3. allows for an extremely high slope at times just about t=0 while maintaining a low peak voltage at t=T; this may not be accomplished with a linear ramp signal, or f(x)=t+c.

Figure 6A:
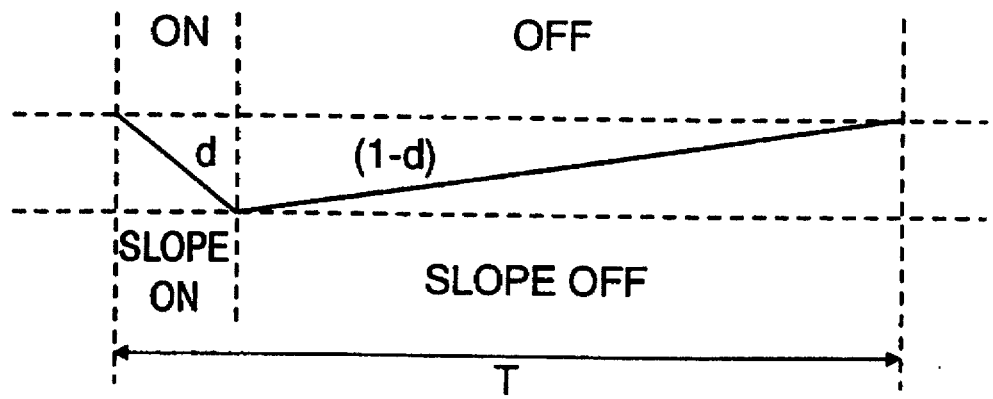
FIG. 6a and 6b shows how the non-linear $t^2$ ramp is determined according to certain principles of the present invention.

Further improvements to the power factor/harmonics correction circuitry involve a non-linear ramp circuit which is described in the following embodiments as being used with ramp modulation circuitry. The non-linear ramp circuit, however, can be used without the ramp modulation circuitry. The non-linear ramp circuitry is also found in the ramp generator 40 of FIG. 4. The non-linear ramp circuitry provides a ramp signal which has an increasing slope over the switching cycle. As shown in FIG. 6a, the critical slope of the non-linear ramp can be calculated, where in average current mode control:

(duty cycle)(slopeon)=(1-duty cycle)(slopeoff), where L=inductance slopeon=Vin/L, slopeoff=(Vo–Vin)/L, or duty cycle=(Vo–Vin)/Vo.

Figure 6B:
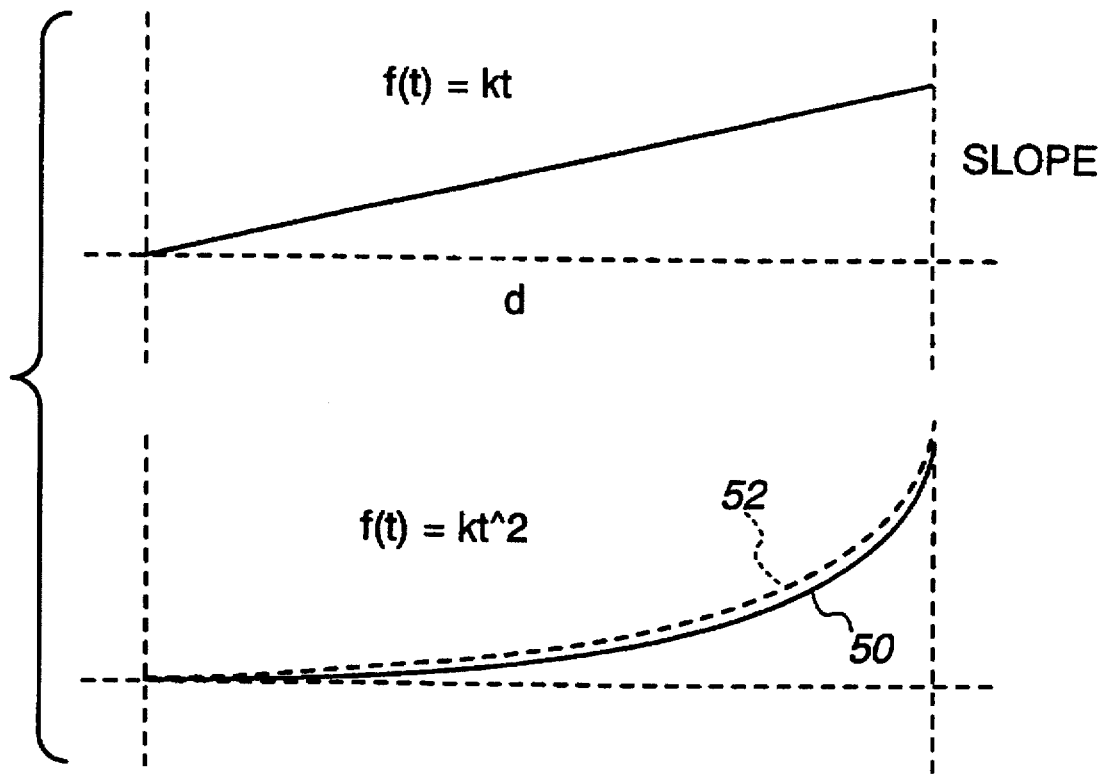
Figure 7B:
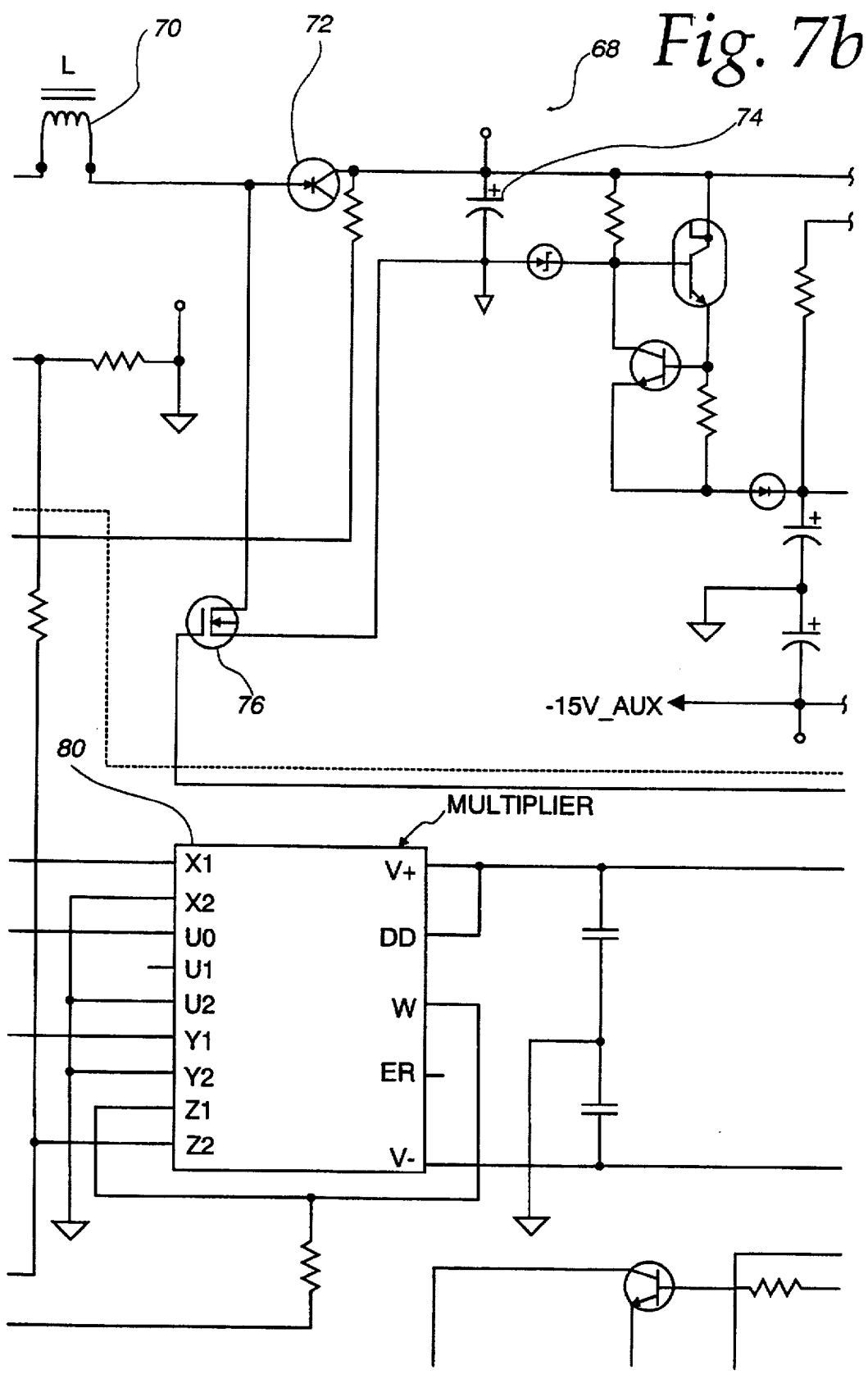
Figure 7C:
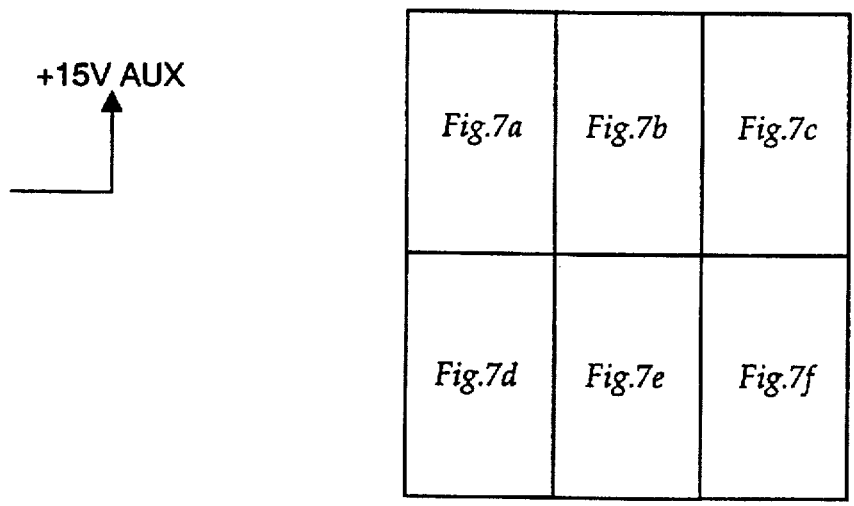
Figure 7C:
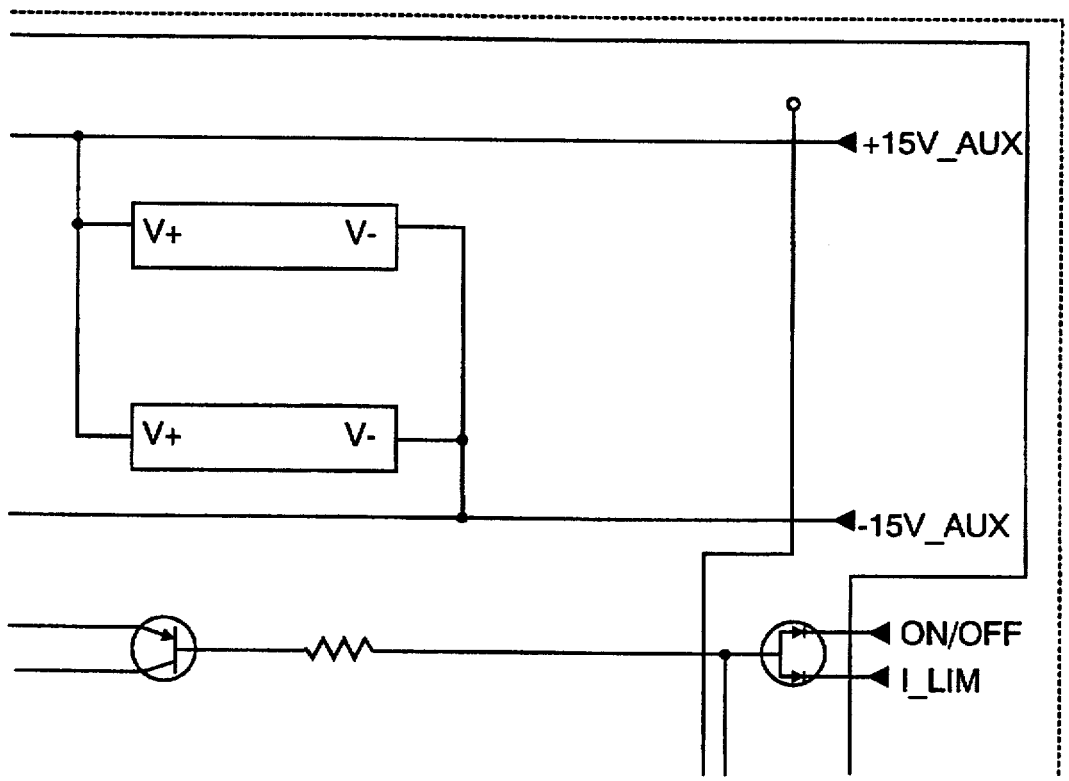
Figure 7D:
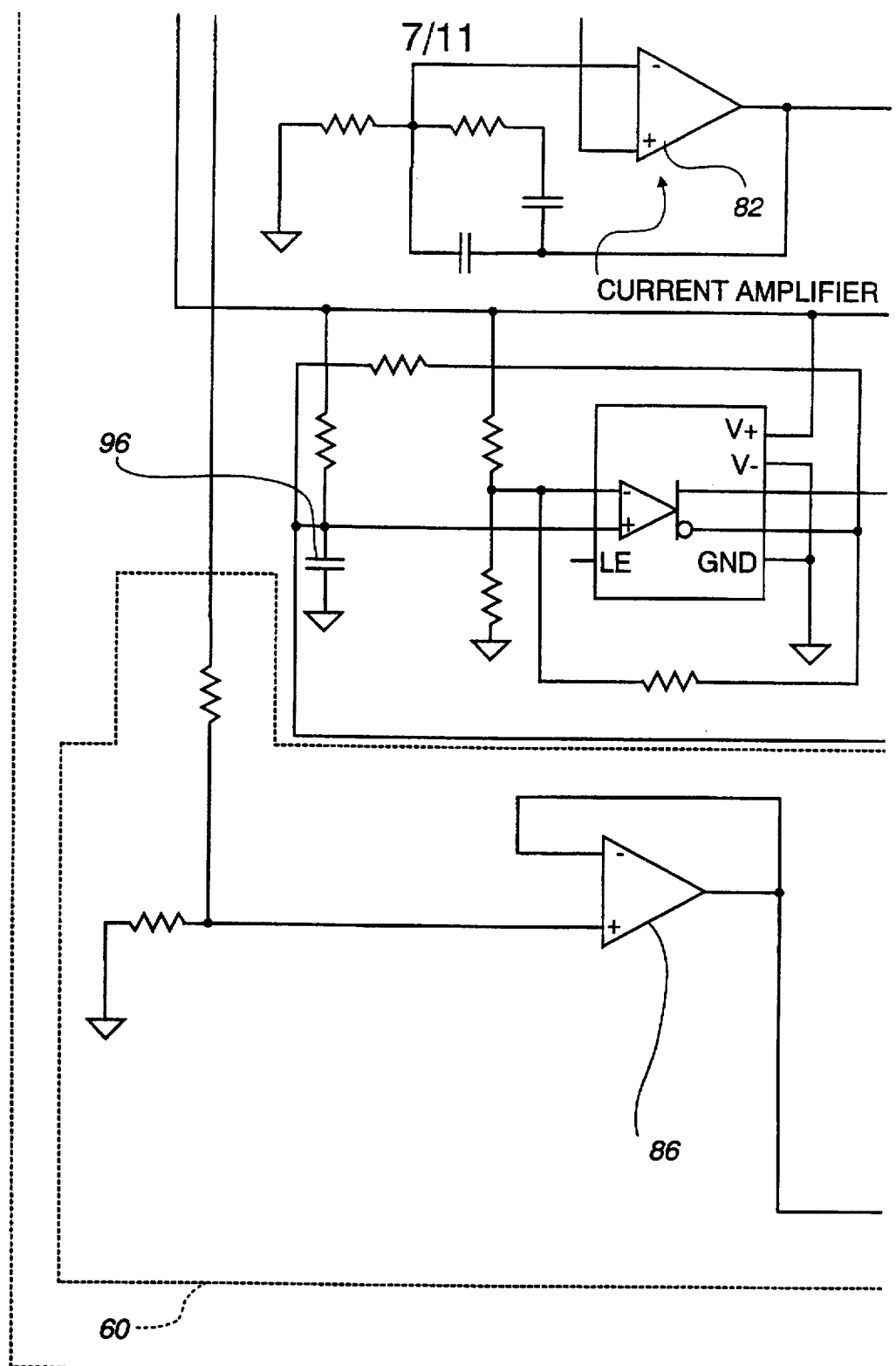
Figure 7E:
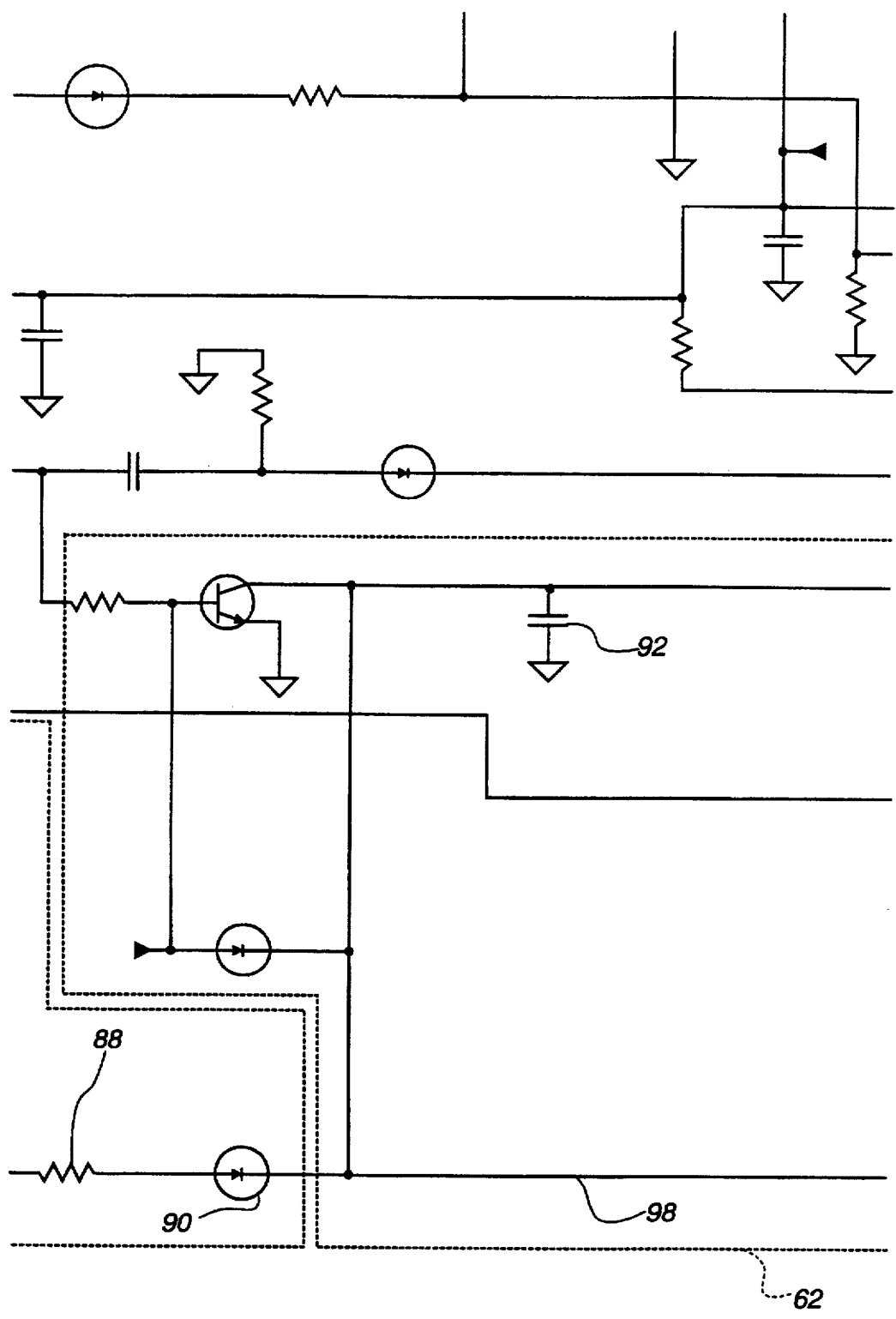
Figure 7F:
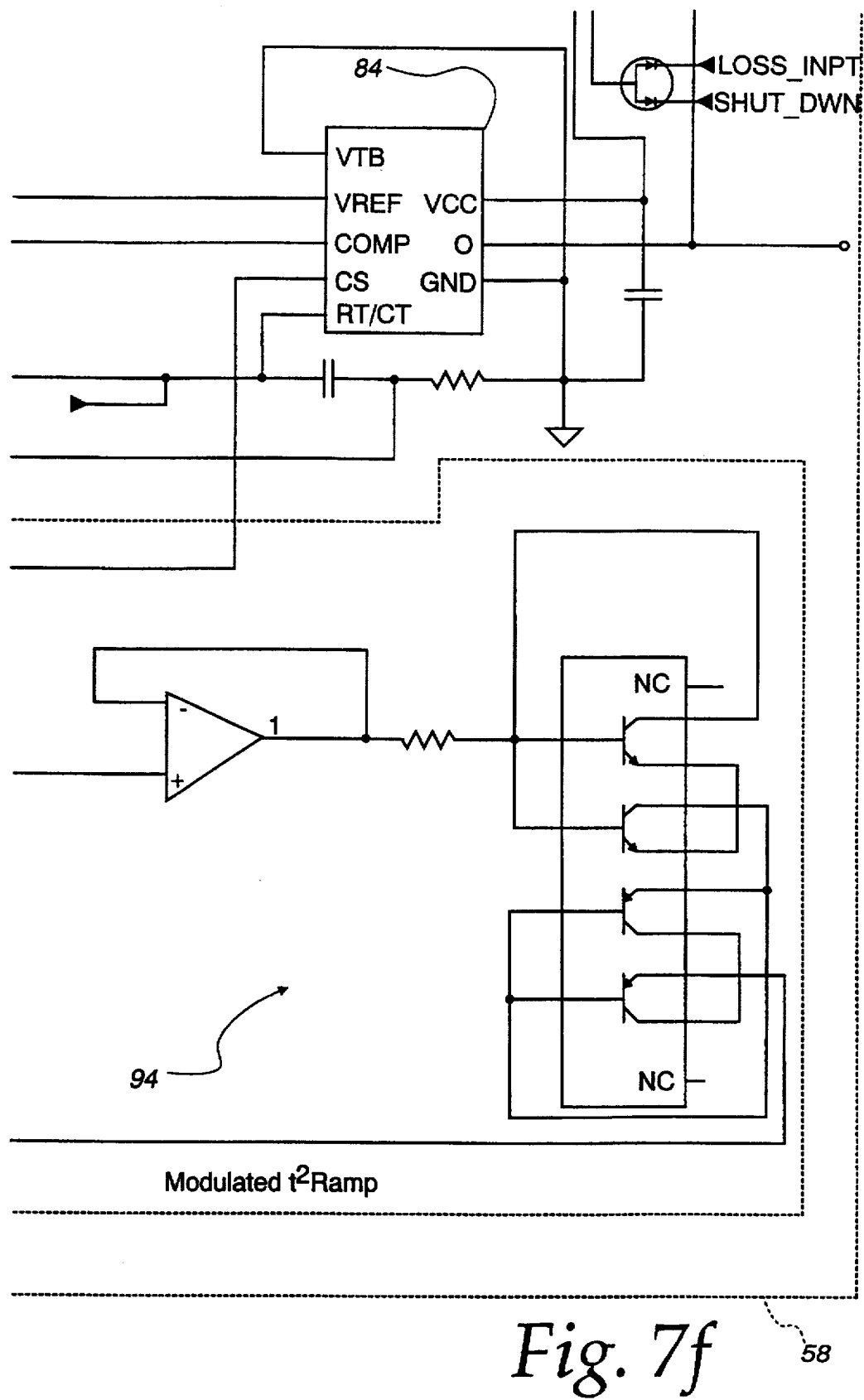

At a steady state input of any value from Vin=0 to Vin=Vo, the duty cycle is known. The critical down slope can be determined for a given duty cycle as (Vo–Vin)/L. Thus, the critical downslope may be calculated as the duty cycle approaches 100%. If the critical slope is plotted versus the change in the duty cycle over T (the switching period), the slope equation is equivalent to kt as shown in FIG. 6b. To obtain the non-linear ramp curve, kt is integrated as follows:

$$\int kt = \tfrac{1}{2}kt^2 \text{ or } kt^2.$$

The non-linear $t^2$ ramp signal 50 of this particular embodiment is shown in FIG. 6b. If t and k are normalized to 1, then the slope at Vin=0 (or full duty cycle) becomes $d/dt(t^2)=2t$ at t=1 or 2. This will effectively add $20 \log_{10}(2)$ or 6 db of improved error amplifier gain. Error amplifier gain will become critical as it will follow the $t^2$ curves. Thus, some small amount of linearity can be added, or amplifier gain can be chosen to be slightly less than the critical value so as not to fall below the $t^2$ ramp as depicted by the modulated ramp signal 52 of FIG. 6b.

FIGS. 7a–7f show a power supply 56 using a particular embodiment of the power factor/harmonics correction circuitry 58. In this particular embodiment, ramp modulation circuit 60 improves transient response and noise reduction, and the non-linear ramp circuit 62 (the $t^2$ ramp in this particular embodiment) improves current error amplifier gain which improves harmonic/power factor correction. The circuitry 58 is used with a supply 56 having a rectifier 64 adapted to be connected to an alternating current line 66. Alternatively, a DC source could be used which would not require the rectifier 64. The power supply 56 includes a boost converter 63 connected to the output of the rectifier 64. The boost converter 68 includes an input circuit having a series connected inductance coil 70 and a diode 72, an output circuit having a storage capacitor 74, and a power switch 76 connected between the inductance coil 70 and the storage capacitor 74.

The power factor/harmonics correction circuitry 58 is incorporated into control circuit for the boost converter 68. The power factor/harmonics corrections circuitry 58 is connected to the power switch 76 For providing a switch control signal for the boost converter 68. In this particular embodiment, the power factor/harmonics correction circuitry 58 includes a multiplier 80 which multiplies the rectified input voltage X and the output voltage Y which are scaled, divides by the average of X and subtracts a voltage I representing the line current, thereby producing a signal Z. An error amplifier 82 integrates the signal from the multiplier 80 to produce an error signal. A pulse width modulator 84 compares the error signal to a ramp signal and provides the switch control signal to the power switch 76. In this particular embodiment, the power factor/harmonic correction module 58 provides a modulated $t^2$ ramp signal to the pulse width modulator 84 for comparison with the error signal. To accomplish this, the power factor/harmonic correction module 58 uses the modulated ramp circuit 60 and the non-linear ramp circuit 62.

The modulated ramp circuit 60 receives the scaled, rectified input voltage Vin and adds a constant value C (FIG. 5) to the ramp signal 44 (FIG. 5) that is proportional to the rectified input voltage Vin. In this particular embodiment, the modulated ramp circuit 60 uses an operational amplifier 86 to scale the input voltage and a resistor 88 and diode 90 in series with the op amp 86 output to add a the constant value C (FIG. 5) to the ramp signal 44 (FIG. 5) from the non-linear ramp circuit 62. The modulated ramp signal 46 of FIG. 5 has a leading edge curve 48. This occurs due to the charging of the capacitor 92 through the resistor 88 and diode 90. In a digital application, the constant m could simply be added to the ramp signal, or if desired, the leading edge curve 48 could be digitally reproduced.

The non-linear ramp circuit 62 produces the non-linear ramp signal which has an increasing slope over a cycle. In this particular embodiment, the ramp signal 44 (FIG. 5) is the $t^2$ curve which is obtained by using a current source 94 which receives a linear ramp signal t from capacitor 96. The current source 94 produces a current kt+m on line 98 which charges the capacitor 92. The charging of the capacitor 92 acts to integrate the capacitor voltage to $kt^2$+mt over a cycle which adds a constant current source of some small value to add a tolerance to the capacitor voltage so that the $kt^2$ critical slope of the ramp is not violated. In a digital application, the desired ramp signal can simply be calculated. The non-linear ramp with increasing slope increases error amplification gain which improves power factor/harmonic correction, improves stability near zero volt crossover and works for any voltage input, AC or DC. The nonlinear feedforward arrangement also can be used to limit maximum duty cycle as Vin increases.

Figure 8A:
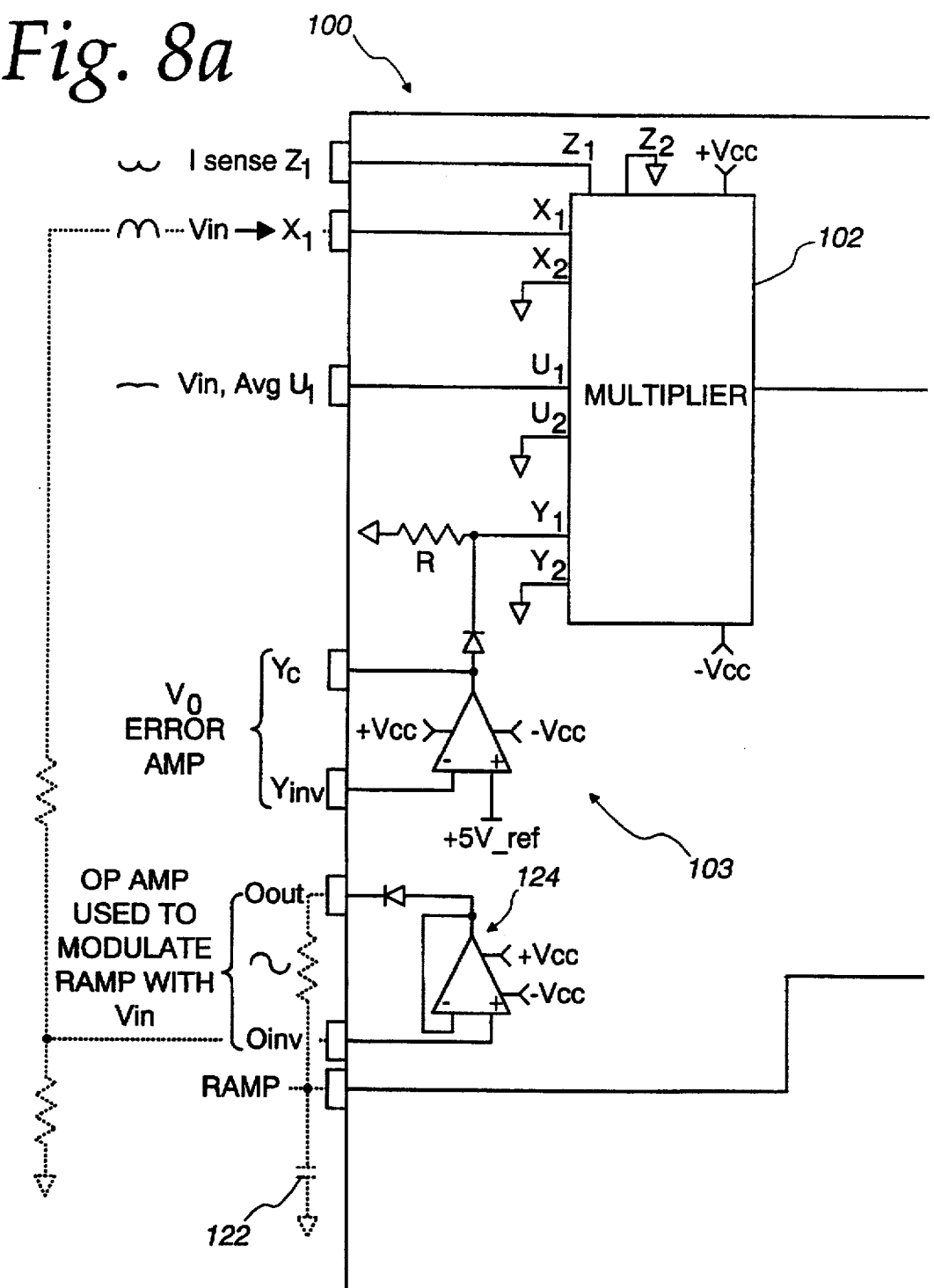
FIGS. 8a–8b show another embodiment of the power factor/harmonic correction circuitry which uses a modulate, non-linear ramp signal according to the principles of the present invention.
Figure 8:
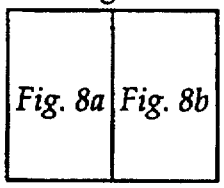
Figure 8B:
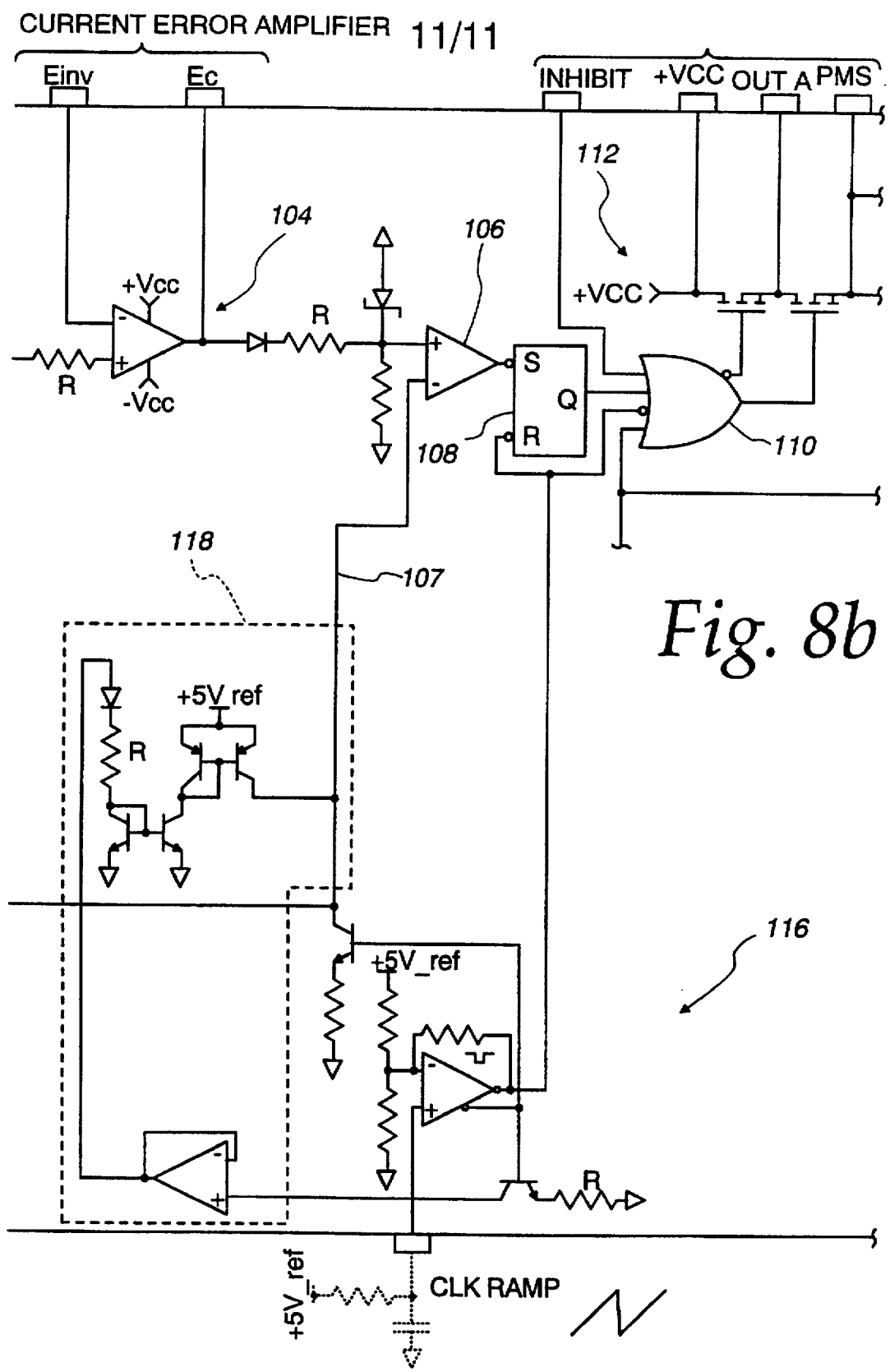

FIGS. 8a-8b show an embodiment of the power factor/harmonic correction circuitry 100 designed for implementation as part of an analog chip. The circuit 100 includes a multiplier 102 which receives the rectified input voltage X, the current voltage I representing the current in the power supply, the average X and an output feedback voltage Y from Vout feedback circuit 103. The multiplier 102 produces a signal representing (X*Y)/avg(X)−I. The multiplier output is received and amplified by error amplifier 104 to produce an error signal. A comparator 106 compares the error signal to a modulated ramp signal on line 107. The result of the comparison is received by a latch 108 for noise reduction purposes and subsequently fed into a logic gate 110 and output drivers 112 to output the switch control signal to the boost converter. In this particular embodiment, the latch 106, the gate 110 and the drivers 112 represent the pulse width modulator logic block of the pulse width modulator 34 (FIG. 4).

A clock circuit 116, which also dictates the discharge or capacitor 122, produces a linear ramp signal which is received by a non-linear ramp circuit 118. The non-linear ramp circuit 118 provides a current source kt+m which produces the $kt^2$ non-linear ramp signal on line 120 by charging capacitor 122. A modulated ramp circuit 124 receives a scaled version of the input voltage Vin and produces a constant value C that is proportional to the input voltage Vin. The modulated ramp circuit 124 adds the constant value C to the ramp signal (the non-linear $t^2$ ramp signal in this embodiment). In this particular embodiment, the modulated, non-linear ramp signal on the capacitor 122 is fed into the comparator 106 of the pulse width modulator 34 (FIG. 4). As a result, the pulse width modulator 34 (FIG. 4) produces the switch control signal to provide the enhanced performance provided by the various aspects of the present invention.

The invention can be used as part of the power supply module of any product to correct power factor or harmonic distortion for a wide range of frequencies and a wide range of voltage inputs. The principles of the present invention, which have been disclosed by way of the above examples and discussion, can be implemented using other power factor/harmonic correction circuitry configurations and implementations. For example, the improved power factor/harmonic correction circuitry can be implemented as digital circuitry in a hardwired integrated circuit or in a processor-based system running software. Those skilled in the art will readily recognize that these and various other modifications and changes may be made to the present invention without strictly following the exemplary application illustrated and described herein and without departing from the true spirit and scope of the present invention.

I claim:

1. A power factor/harmonic compensation circuitry for a power supply having a voltage input, said power supply includes a boost converter connected to the voltage input, the boost converter including an inductance coil and a storage capacitor, and further including a power switch connected between the inductance coil and the storage capacitor, and a control circuit connected to the power switch for providing a switch control signal for the boost converter, said control circuit including an error compensation circuit which produces an error signal, a pulse width modulator compares the error signal to a modulated ramp signal and provides the switch control signal during each switching cycle, said power factor/harmonic compensation module comprising:

a modulated ramp circuit connected to the voltage input, said modulated ramp circuit receives an input voltage and adds a constant value that is proportional to the input voltage to a ramp signal to produce the modulated ramp signal.

2. The circuitry of claim 1 wherein said voltage input includes a rectifier adapted to be connected to an alternating current line.

3. The circuitry of claim 1 wherein said error compensation circuit includes a multiplier producing a signal by multiplying a voltage input signal and an output voltage signal, dividing by the average of the voltage input signal and subtracting a voltage representing the line current.

4. The circuitry of claim 3 wherein said error compensation circuit includes an error amplifier connected to said multiplier which integrates the signal from said multiplier to produce an error signal.

5. The circuitry of claim 1 wherein said pulse width modulator includes a comparator.

6. The circuitry of claim 5 wherein said pulse width modulator includes pulse width modulation circuitry connected to said comparator.

7. The circuitry of claim 1 further including a non-linear ramp circuit which produces the ramp signal which has an increasing slope over the switching cycle.

8. The circuitry of claim 7 wherein said non-linear ramp circuit produces a $kt^2$ ramp signal.

9. The circuitry of claim 1 wherein said modulated ramp circuit produces the modulated ramp signal with a leading edge curve.

10. The circuitry of claim 1 wherein said ramp signal is linear.

11. A power factor/harmonic compensation circuitry for a power supply having a voltage input, said power supply includes a boost converter connected to the voltage input, the boost converter includes an inductance coil and a storage capacitor, and further including a power switch connected between the inductance coil and the storage capacitor, and a control circuit connected to the power switch for providing a switch control signal for the boost converter, said control circuit including an error compensation circuit which produces an error signal, a pulse width modulator compares the error signal to a ramp signal and provides the switch control signal during each switching cycle, said power factor/harmonic compensation module comprising:

a non-linear ramp circuit produces the ramp signal which has an increasing slope over the switching cycle.

12. The circuitry of claim 11 wherein said voltage input includes a rectifier adapted to be connected to an alternating current line.

13. The circuitry of claim 11 wherein said error compensation circuit includes a multiplier producing a signal by multiplying a voltage input signal and an output voltage signal, dividing by the average of the voltage input signal and subtracting a voltage representing the line current.

14. The circuitry of claim 13 wherein said error compensation circuit includes an error amplifier connected to said multiplier which integrates the signal from said multiplier to produce an error signal.

15. The circuitry of claim 11 wherein said pulse width modulator includes a comparator.

16. The circuitry of claim 15 wherein said pulse width modulator includes pulse width modulation circuitry connected to said comparator.

17. The circuitry of claim 11 wherein said non-linear ramp circuit produces a $kt^2$ ramp signal.

18. The circuitry of claim 11 further including a modulated ramp circuit connected to the voltage input, said modulated ramp circuit receives an input voltage and adds a constant value that is proportional to the input voltage to the ramp signal.

19. The circuitry of claim 18 wherein said modulated ramp circuit produces the modulated ramp signal with a leading edge curve.

20. A power factor/harmonic correction module for a power supply having a rectifier adapted to be connected to an alternating current line, said power supply includes a boost converter connected to the output of the rectifier, the boost converter including an input circuit having a series connected inductance coil and an output circuit having a storage capacitor, and further including a power switch connected between the inductance coil and the storage capacitor, and a control circuit connected to the power switch for providing a switch control signal for the boost converter, said control circuit including a multiplier producing a signal by multiplying the rectified input voltage and the output voltage and subtracting a voltage representing the line current, an error amplifier integrates said signal from said multiplier to produce an error signal, a pulse width modulator compares the error signal to a modulated ramp signal and provides the switch control signal, said power factor/harmonic compensation module comprising:

a modulated ramp circuit connected to the rectifier, said modulated ramp circuit receives an input voltage and adds a constant value that is proportional to the input voltage to a ramp signal to produce the modulated ramp signal; and a non-linear ramp circuit produces the ramp signal which has an increasing slope over a cycle.

21. A method for correcting power factor/harmonic distortion in a power supply having a voltage input, said power supply includes a boost converter connected to the voltage input, the boost converter including an inductance coil and a storage capacitor, and further including a power switch connected between the inductance coil and the storage capacitor, and a control circuit connected to the power switch for providing a switch control signal for the boost converter, said control circuit including an error compensation circuit which produces an error signal, a pulse width modulator compares the error signal to a modulated ramp signal and provides the switch control signal during each switching cycle, said method comprising the steps of:

modulating a ramp signal to produce the modulated ramp signal by adding a constant value that is proportional to an input voltage of the voltage input to a ramp signal.

22. A method for correcting power factor/harmonic distortion in a power supply having a voltage input, said power supply includes a boost converter connected to the voltage input, the boost converter including an inductance coil and a storage capacitor, and further including a power switch connected between the inductance coil and the storage capacitor, and a control circuit connected to the power switch for providing a switch control signal for the boost converter, said control circuit including an error compensation circuit which produces an error signal, a pulse width modulator compares the error signal to a modulated ramp signal and provides the switch control signal during each switching cycle, said method comprising the steps of:

producing the ramp signal to have an increasing slope over the switching cycle.

23. A method for correcting power factor/harmonic distortion in a power supply having a rectifier adapted to be connected to an alternating current line, said power supply includes a boost converter connected to the output of the rectifier, the boost converter including an input circuit having a series connected inductance coil and an output circuit having a storage capacitor, and further including a power switch connected between the inductance coil and the storage capacitor, and a control circuit connected to the power switch for providing a switch control signal for the boost converter, said control circuit including a multiplier producing a signal by multiplying the rectified input voltage and the output voltage and subtracting a voltage representing the line current, an error amplifier integrates said signal from said multiplier to produce an error signal, a pulse width modulator compares the error signal to a modulated ramp signal and provides the switch control signal, said method comprising the steps of:

modulating a ramp signal to produce the modulated ramp signal by adding a constant value that is proportional to an input voltage of the voltage input to a ramp signal; and producing the ramp signal to have an increasing slope over the switching cycle.

* * * * *